No. 885,204. PATENTED APR. 21, 1908.
J. S. TUTTLE.
BALING PRESS.
APPLICATION FILED NOV. 25, 1907.
2 SHEETS—SHEET 1.
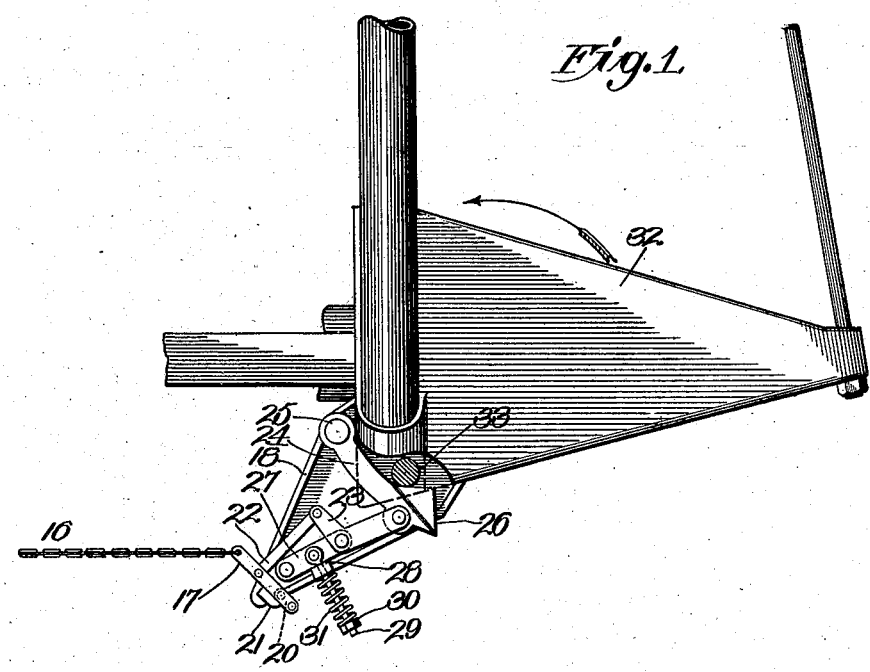
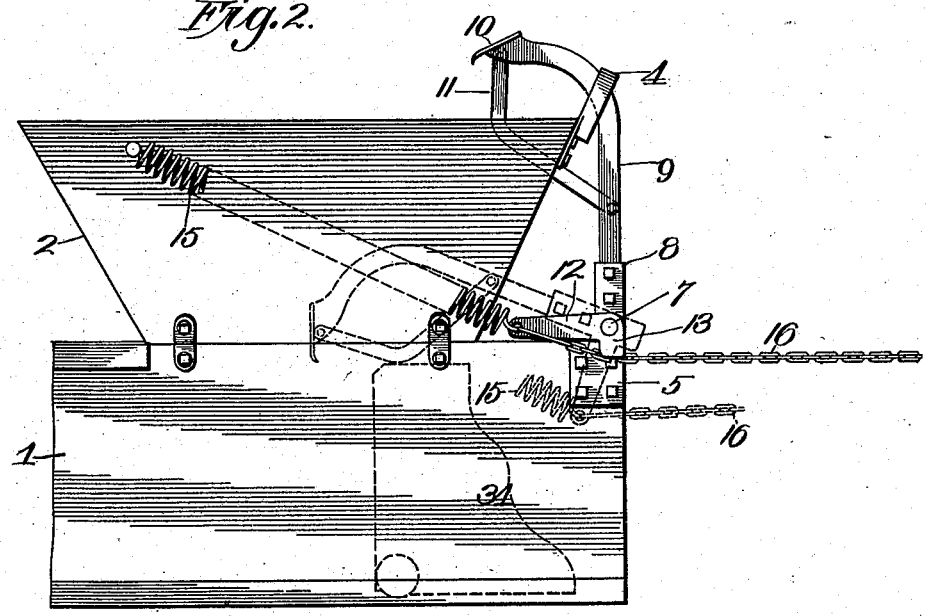
Witnesses
Inventor
J. S. Tuttle No. 885,204. PATENTED APR. 21, 1908.
J. S. TUTTLE.
BALING PRESS.
APPLICATION FILED NOV. 25, 1907.
2 SHEETS—SHEET 2.
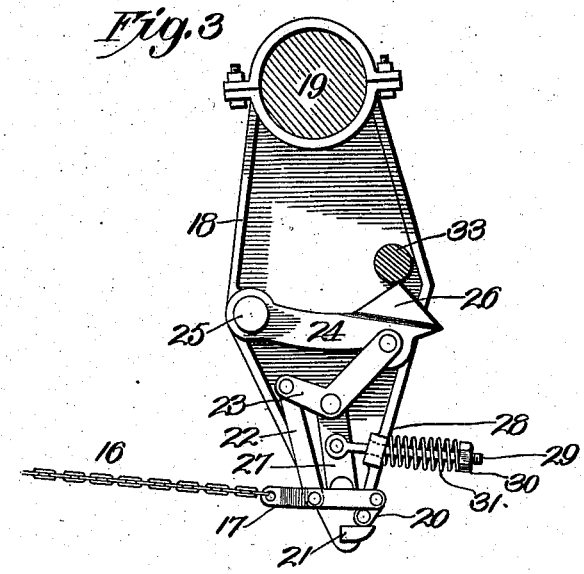
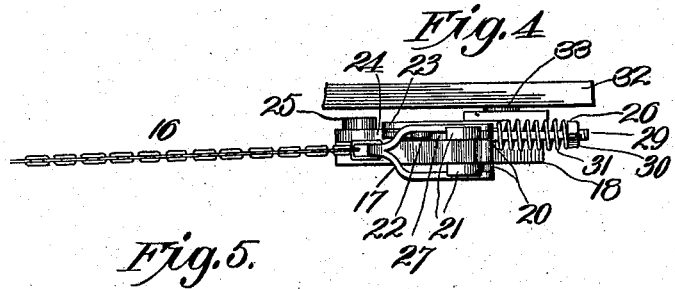
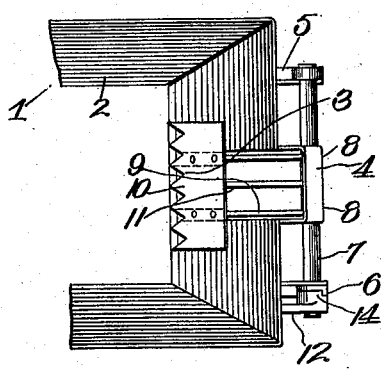
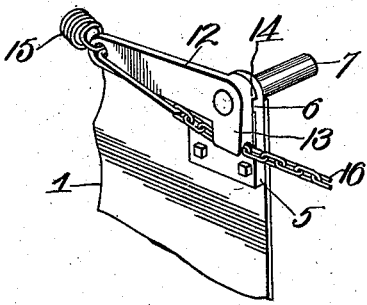
Witnesses
Frank R. Glore
H. C. Rodgers
Inventor
J. S. Tuttle
By George A. Thorpe Atty.

UNITED STATES PATENT OFFICE.

JOSIAH S. TUTTLE OF BELLEVUE, OHIO, ASSIGNOR TO GEO. ERTEL CO., OF QUINCY, ILLINOIS, A CORPORATION OF ILLINOIS.

BALING-PRESS.

No. 885,204.        Specification of Letters Patent.        Patented April 21, 1908.

Application filed November 25, 1907. Serial No. 403,659.

*To all whom it may concern:*

Be it known that I, JOSIAH S. TUTTLE, a citizen of the United States, residing at Bellevue, in the county of Huron and State of Ohio, have invented certain new and useful Improvements in Baling-Presses, of which the following is a specification.

This invention relates to self feeders for baling presses of that class embodying means for effecting a positive release of the feeder at a predetermined time, and a premature release of the feeder in the event that it is prevented from making its full downward stroke by an overcharge of baling material or from any other cause.

A further object is to produce a feeder provided with a brace or knee which will prevent any possibility of the feeder being injured by the baling plunger.

With these general objects in view and others as hereinafter appear, the invention consists in certain novel and peculiar features of construction and organization as hereinafter described and claimed; and in order that it may be fully understood reference is to be had to the accompanying drawings, in which, Figure 1, is a top plan view of a portion of the power end of a baling press equipped with feeder-operating attachments embodying my invention, the sweep head being broken away to disclose one of its depending pins for effecting the operation of the feeder. Fig. 2, is a side elevation on a smaller scale of a portion of the baling case end of the press, equipped with a feeder embodying my invention. Fig. 3, is a horizontal section on a larger scale than Fig. 1, of the power shaft and one of the sweep-head pins and also shows in plan view the feeder-operating attachment in the position occupied to effect the positive release of the feeder. Fig. 4, is a side view of the construction shown in Fig. 3, except that the power shaft is omitted and a portion of the sweep head is shown. Fig. 5, is a top plan view of the front end of the baling case hopper and also discloses the feeder. Fig. 6, is an enlarged perspective view of a portion of the baling case, the feeder shaft and certain parts connected thereto, to operate the same in opposite directions.

In the said drawings, where like reference characters identify corresponding parts, 1 indicates a baling case of the usual or any preferred type provided with a superposed communicating feed hopper 2, said hopper being provided with an opening 3 at its front end and an arch 4 bridging the opening and increasing its length.

5 are bearing plates secured to the front upper corners of the baling case and 6 is a lug projecting outward from one of said bearing plates forward of the transverse rock shaft 7 journaled in said plates.

8 indicates crank arms projecting from said shaft as a means of securing rigidly thereto a feeder consisting of a pair of parallel inverted-L bars 9 connected at their free ends by a toothed plate 10.

11 indicates a knee brace connected at its opposite ends to bars 9, and bowed in the opposite direction to said bars so that a line from the axis of the shaft tangentially to said knee will clear the outer or toothed end of plate 10.

12 indicates a crank arm secured rigidly to one end of shaft 7 and disposed substantially at right angles to arms 8 thereof, projecting rearwardly when said arms are projecting upwardly, and said crank arm is provided with a grooved heel 13, disposed downward normally and with a shoulder 14 normally bearing downward upon lug 6 and preventing the crank arm 12 from swinging upward beyond the position indicated in full lines, this shoulder and lug 6 preventing the feeder from being thrown violently against the top of arch 4, by the retractile action of spring 15, connecting crank arm 12 with the hopper.

16 indicates a chain or equivalent flexible connection pivotally connected to crank arm 12 and normally engaging the grooved heel, the depression of the chain by such heel maintaining it in such position that the forward pull upon the chain will tend to swing the crank arm downward to the position shown by dotted lines in Fig. 2, and hence swing the feeder down through the hopper. The chain 16 is pivotally connected at its front end to the forked or bifurcated swing bar 17 fitting over the outer end of a swing frame 18 journaled on the power shaft 19 and adapted as hereinafter explained to be swung forwardly under the power of said shaft. The rear ends of the arms of the forked or bifurcated swing bar are pivotally connected to short swing arms 20 pivoted to swing frame 18 inward of stop lugs 21 formed on said swing frame; said stop lugs being designed for the purpose of preventing the swing arm 17 from ever swinging outwardly beyond the position shown in Fig. 1.

22 indicates a link pivotally connecting the forked or bifurcated swing arm 17 with one end of a bell crank or floating lever 23, the opposite end of the same being pivotally connected to a trigger 24 pivoted at 25 to the swing frame 18 and provided at its rear end and inner side with an inwardly projecting V-shaped or cam tooth 26.

27 indicates a fulcrum bar pivoted to the swing frame and carrying at its free or inner end a fulcrum for the floating or bell crank lever 23, and forming with the latter a toggle connection between the swing frame and the trigger. Pivoted to the pivoted or movable fulcrum bar 27, and extending slidingly outward through a lug 28 projecting upward from the swing frame, is a bolt 29 equipped with a nut 30 and a helical spring 31, bearing at its opposite ends against said lug and nut, the adjustment of the latter obviously varying the tension of the spring and conseqeuntly the resistance which the toggle offers to contractive action and hence to outward pivotal movement of the trigger.

In practice when the feeder occupies the position shown in full lines Fig. 2, the attachments for operating the same occupy the position shown in Fig. 1, so that as the sweep revolves in the direction indicated by the arrow in the last-named figure, one of its pins 33 by pressure against the cam or toothed end of the trigger will move the swing frame in the direction indicated by the last-named arrow, it being understood that the resistance of spring 31 is sufficient to prevent the pivoted fulcrum bar from swinging in the opposite direction, unless the resistance offered to the feeder is greater than that offered by an ordinary charge of baling material. Assuming that the feed is normal and that the resistance is normal, the swing frame will move from approximately the position shown in Fig. 1, to approximately the position shown in Fig. 3, it being noted that as the swing frame attains a position almost at right angles to the length of the press, the resistance of chain 16 or its pull on swing bar 17 will cause the latter to swing inwardly because the rear end of the chain occupies a position nearer the longitudinal center of the press than said swing bar. This inward movement of the swing bar 17 through the medium of link 22 presses inwardly on the rear end of the bell crank or floating lever, and overcoming the resistance of spring 31, swings the fulcrum bar 27 in the opposite direction to the movement of the swing frame 18 and consequently cooperates with bar 27 and link 22 in rocking the bell crank or floating lever, and hence the trigger 24 outward until the cam tooth of the latter is withdrawn from the path of the sweep head pin 33. In the described operation of the swing frame and of the simultaneous depression of the feeder, the spring 15 is tensioned as indicated by the dotted lines Fig. 2, and hence as said trigger is tripped from the path of the sweep head pin, retracts so as to reëlevate the feeder and swing the swing frame back to its original position. With each normal operation the above actions are repeated.

In the event that an overcharge of baling material is placed in the hopper, or from other cause, the feeder is unable to make its full downward stroke, it will be prematurely released because the spring 31 will yield before a breaking strain is imposed on the feeder or any of the connections. In this case the release will take place at some point intermediate of the extreme positions represented by the swing frame in Figs. 1 and 3 respectively, that is to say will take place before the swing frame has attained such position as to cause the chain to swing bar 17 inward as shown in Fig. 3 and already described.

It will be noticed by reference to Fig. 1, that the fulcrum point of the bell crank or floating lever is slightly inward of the vertical plane of the pivotal point of the fulcrum bar for said lever and the pivotal point of the latter with the trigger. For this reason the sweep head pin in the event that the feeder can make its full downward stroke will force the trigger outward, the spring 31 yielding to permit the fulcrum bar to swing rearwardly under the pressure imposed on its free end by the bell crank or floating lever. It will thus be seen that the chance of breakage of the feeder or feeder connections or actuating mechanism is reduced to the minimum and that as long as the parts remain intact and operative there is no possibility of the plunger 34 coming in contact with the feeder. In the event that the spring 15 or arm 12 should break and thus permit the feeder to drop down into the press, the former is protected from injury by the plunger because the latter by striking the knee brace 11 will swing the feeder upwardly out of its path. It will thus be seen that this knee brace not only stiffens and braces the feeder but possesses the additional function of safeguarding it from injury under certain conditions which obtain at times in actual practice.

From the above description it will be apparent that I have produced a self feeder mechanism for baling presses possessing the features of advantage enumerated and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a baling press, a swing frame, a movable trigger carried thereby, a fulcrum bar pivoted to the swing frame, a lever fulcrumed on the fulcrum bar and pivoted to the trigger and constituting with the fulcrum bar a toggle between the swing frame and the trigger, yielding means for expanding the toggle, an arm projecting from one member of the toggle, a feeder, connections between the feeder and the said arm of the toggle member, and yielding means for holding the feeder and swing frame at one limit of their movements.

2. In a baling press, a swing frame, a movable trigger carried thereby, a fulcrum bar pivoted to the swing frame, a lever fulcrumed on the fulcrum bar and pivoted to the trigger and constituting with the fulcrum bar a toggle between the swing frame and the trigger, yielding means for expanding the toggle, an arm projecting from one member of the toggle, a feeder, connections between the feeder and the said arm of the toggle member, yielding means for holding the feeder and swing frame at one limit of their movements, and a rotatable device for engaging the trigger and imparting simultaneous movement to the swing frame and the feeder in opposition to the last-named yielding means.

3. In a baling press, a swing frame, a movable trigger carried thereby, a fulcrum bar pivoted to the swing frame, a lever fulcrumed on the fulcrum bar and pivoted to the trigger and constituting with the fulcrum bar a toggle between the swing frame and the trigger, yielding means for expanding the toggle, an arm projecting from one member of the toggle, a feeder, connections between the feeder and the said arm of the toggle member, yielding means for holding the feeder and swing frame at one limit of their movements, a rotatable device for engaging the trigger and imparting simultaneous movement to the swing frame and the feeder in opposition to the last-named yielding means, and means to effect premature contraction of the toggle in the event that the feeder movement produced by the engagement of the rotatable device with the trigger is prematurely ended.

4. In a baling press, a swing frame, a trigger pivoted thereto and having its inner end disposed nearer than its outer end to the axis of movement of the swing frame, a bar pivoted to the swing frame and projecting toward the trigger, a lever pivotally connecting said bar and the trigger and forming a toggle in conjunction with said bar, a spring tending to hold the swing bar and the lever in alinement to prevent outward movement of the trigger, an arm projecting laterally from the toggle, a swing arm pivoted to the swing frame, a swing bar pivoted thereto, a link pivotally connecting the swing bar with the arm, and a stop lug on the swing frame to prevent the swing bar linked to the arm of the toggle from swinging outwardly beyond a predetermined position.

5. In a baling press, a swing frame, a trigger pivoted thereto and having its inner end disposed nearer than its outer end to the axis of movement of the swing frame, a bar pivoted to the swing frame and projecting toward the trigger, a lever pivotally connecting said bar and the trigger and forming a toggle in conjunction with said bar, a spring tending to hold the swing bar and the lever in alinement to prevent outward movement of the trigger, an arm projecting laterally from the toggle, a swing arm pivoted to the swing frame, a swing bar pivoted thereto, a link pivotally connecting the swing bar with the arm, a stop lug on the swing frame to prevent the swing bar linked to the arm of the toggle from swinging outwardly beyond a predetermined position, and a rotatable device to engage the inner end of the trigger for the purpose of swinging the swing arm forwardly.

6. In a baling press, a swing frame, a trigger pivoted thereto and having its inner end disposed nearer than its outer end to the axis of movement of the swing frame, a bar pivoted to the swing frame and projecting toward the trigger, a lever pivotally connecting said bar and the trigger and forming a toggle in conjunction with said bar, a spring tending to hold the swing bar and the lever in alinement to prevent outward movement of the trigger, an arm projecting laterally from the toggle, a swing arm pivoted to the swing frame, a swing bar pivoted thereto, a link pivotally connecting the swing bar with the arm, a stop lug on the swing frame to prevent the swing bar linked to the arm of the toggle from swinging outwardly beyond a predetermined position, a movable feeder, and connections between the feeder and the swing bar linked to the arm of said toggle.

7. In a baling press, a swing frame, a trigger pivoted thereto and having its inner end disposed nearer than its outer end to the axis of movement of the swing frame, a bar pivoted to the swing frame and projecting toward the trigger, a lever pivotally connecting said bar and the trigger and forming a toggle in conjunction with said bar, a spring tending to hold the swing bar and the lever in alinement to prevent outward movement of the trigger, an arm projecting laterally from the toggle, a swing arm pivoted to the swing frame, a swing bar pivoted thereto, a link pivotally connecting the swing bar with the arm, a stop lug on the swing frame to prevent the swing bar linked to the arm of the toggle from swinging outwardly beyond a predetermined position, a movable feeder, connections between the feeder and the swing bar linked to the arm of said toggle, and a rotatable device for engaging one end of the trigger and swinging the swing frame forwardly and the feeder downwardly.

8. In a baling press, a swing frame, a trigger pivoted thereto and having its inner end disposed nearer than its outer end to the axis of movement of the swing frame, a bar pivoted to the swing frame and projecting toward the trigger, a lever pivotally connecting said bar and the trigger and forming a toggle in conjunction with said bar, a spring tending to hold the swing bar and the lever in alinement to prevent outward movement of the trigger, an arm projecting laterally from the toggle, a swing arm pivoted to the swing frame, a swing bar pivoted thereto, a link pivotally connecting the swing bar with the arm, a stop lug on the swing frame to prevent the swing bar linked to the arm of the toggle from swinging outwardly beyond a predetermined position, a movable feeder, connections between the feeder and the swing bar linked to the arm of said toggle, a rotatable device for engaging one end of the trigger and swinging the swing frame forwardly and the feeder downwardly, and yielding means for reëlevating the feeder and returning the swing frame to its original position after the trigger has become disengaged from the said rotatable device.

9. In a baling press, a rotatable power shaft, a sweep head rotatable therewith and provided with a plurality of pins, a swing frame pivoted coincidently with the power shaft, a trigger pivoted to the swing frame and provided with an inwardly projecting cam tooth at its free end, a toggle between the trigger and the swing frame and consisting of a fulcrum bar pivoted to the swing frame and a bell crank lever pivoted to said fulcrum bar and to the trigger, a lug projecting from the swing frame at the side of the toggle toward which the latter expands, a rod pivoted to the fulcrum bar and extending through said lug, a nut on the opposite end of the rod, a spring interposed between the lug and nut, a swing arm pivoted to the swing frame, a swing bar pivoted to the swing arm, means to prevent the swing bar moving outward beyond a predetermined distance, and a link pivotally connecting the swing bar with the arm of the bell crank lever.

10. In a baling press, a swing frame, a movable trigger carried thereby, a toggle connecting the trigger and swing frame and consisting of a bar pivoted to the frame and a bell crank lever fulcrumed on said bar and pivoted to the trigger, yielding means for expanding the toggle, a swing bar carried by the swing frame, means to limit outward movement of the swing bar beyond a predetermined point, and a link pivotally connecting the swing bar with the bell-crank lever.

In testimony whereof I affix my signature, in the presence of two witnesses.

JOSIAH S. TUTTLE.

Witnesses:
 ALLAN G. AIGLER,
 H. C. HEYMANN.